United States Patent [19]
Overy et al.

[11] 3,877,230
[45] Apr. 15, 1975

[54] PLURAL-CYLINDER INTERNAL COMBUSTION ENGINES EQUIPPED WITH AN EXHAUST DRIVEN TURBOCHARGER

[75] Inventors: John Overy, Brentwood; Michael John Broad, Enfield, both of England

[73] Assignee: Plessey Handel und Investments A.G., Zug, Switzerland

[22] Filed: July 12, 1973

[21] Appl. No.: 378,741

[30] Foreign Application Priority Data
July 27, 1972 United Kingdom............... 35139/72

[52] U.S. Cl. ................................................. 60/606
[51] Int. Cl. ............................................ F02b 37/00
[58] Field of Search ............ 60/13 N, 606, 614, 313

[56] References Cited
UNITED STATES PATENTS

| | | | |
|---|---|---|---|
| 1,895,538 | 1/1933 | Buchi..................................... | 60/605 |
| 2,620,621 | 12/1952 | Nettel.................................... | 60/13 N |
| 2,654,991 | 10/1953 | Nettel.................................... | 60/13 N |
| 3,591,959 | 7/1971 | Kubis..................................... | 60/605 |

Primary Examiner—C. J. Husar
Assistant Examiner—O. T. Sessions
Attorney, Agent, or Firm—Blum Moscovitz Friedman & Kaplan

[57] ABSTRACT

In a plural-cylinder internal-combustion engine equipped with Buchi-type exhaust- driven supercharger, whose turbine has a plurality of nozzle groups respectively fed by each of the individual cylinders, or of the cylinders of each of a plurality of groups into which this plurality of cylinders is divided, so as to permit utilization of the pulsation energy of the exhaust flow from each of these cylinders or groups of cylinders, maximum power increase of the supercharger in circumstances in which the flow of exhaust gases is insufficient to provide the power required, is made possible with a turbine of minimum dimensions by providing a plurality of by-pass ducts leading, in by-pass to the engine cylinders, from the outlet of a turbocharger compressor respectively to each of the nozzle groups of the turbine, each by-pass duct including a combustion chamber equipped to be fed with fuel additional to the fuel supplied to the engine.

1 Claim, 1 Drawing Figure

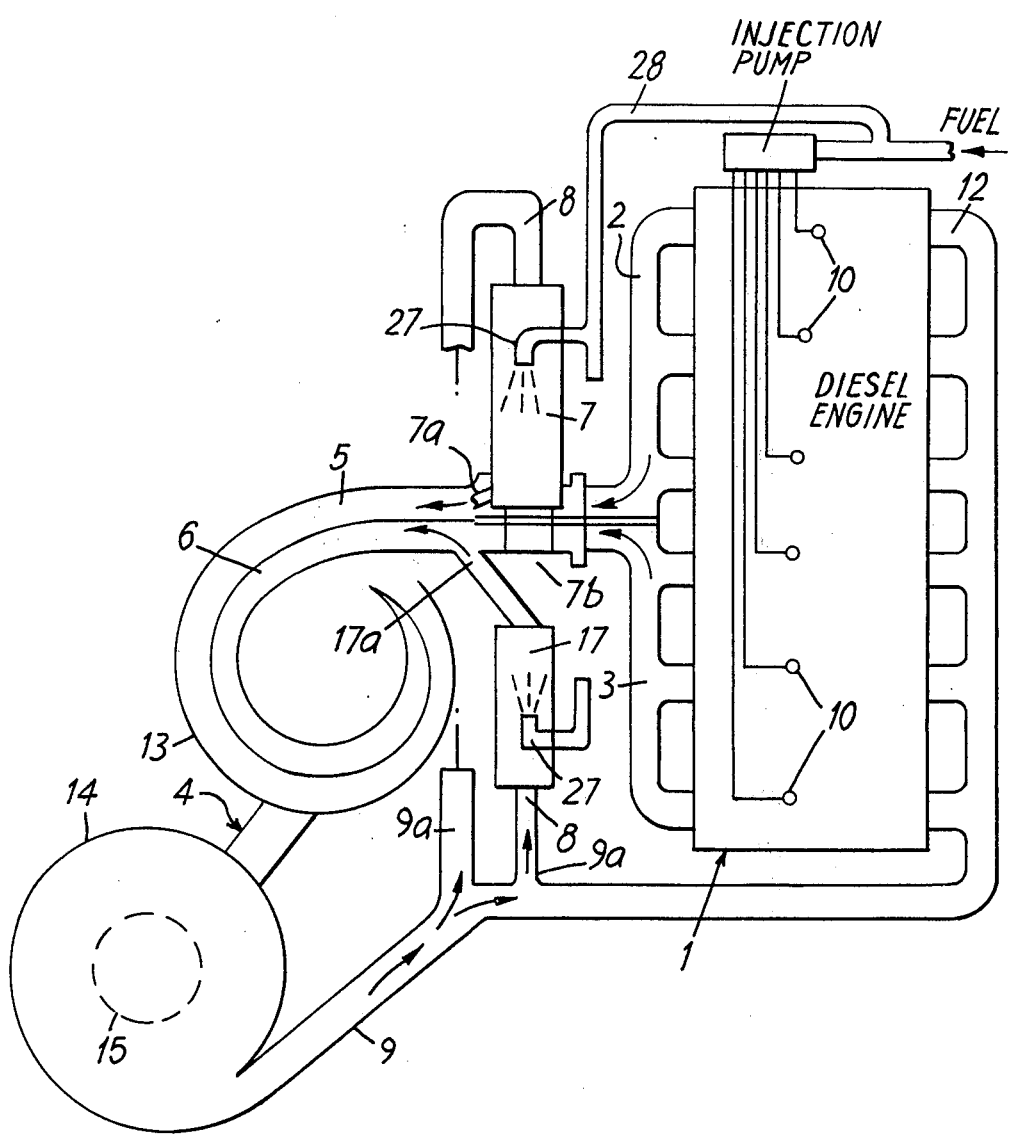

PLURAL-CYLINDER INTERNAL COMBUSTION ENGINES EQUIPPED WITH AN EXHAUST DRIVEN TURBOCHARGER

This invention relates to prime movers comprising a plural-cylinder internal-combustion engine which is equipped with an exhaust-driven turbocharger, and it is an object of the present invention to provide an improved prime mover of this kind in which, according to the so-called Büchi system, the exhaust turbine is equipped with two or more sets of inlet nozzles, and in which the exhaust from each cylinder of the engine, or from each of a number of groups into which the cylinders of the engine are divided, is fed respectively by a separate suitably tuned duct to a different set of these nozzles. Some of the pulsating energy, due to the periodic release of the exhaust from each cylinder can be utilized. Another object is to provide such improved prime mover which, while substantially retaining the advantages of the Büchi system, additionally offers substantially the same advantages as another known system in which a prime mover comprising a plural-cylinder internal-combustion engine that is equipped with an exhaust-driven turbocharger not arranged for utilisation of the pulsating energy due to the periodic release of the exhaust, is provided with an auxiliary combustion chamber, which latter is supplied with combustion air from the output of the turbocharger and with fuel additional to that supplied to the engine, and feeds its gaseous combustion product to the inlet of the exhaust turbine while bypassing the engine cylinders.

These and other objects which will become apparent from the following more detailed description are achieved according to the invention by the combination of feature set out in the appended claim.

In order that the invention may be more readily understood, one embodiment is illustrated in the accompanying drawing, which is a somewhat diagrammatic plan view of an engine incorporating the present invention.

Referring now to the drawing, the exhaust manifold of a plural-cylinder engine, shown as a Diesel engine 1 having burners 10, is subdivided into two portions 2 and 3, of which the former combines the exhaust gases from one half of the number of cylinders of the engine, and the latter combines the exhaust gases from the remaining cylinders. Combustion air is supplied to the inlet mainbold 12 of the engine 1 by a turbocharger 4, which comprises a turbine 13 and a dynamic compressor 14 driven by the shaft 4 of the turbine 13 and having an inlet 15 for combustion air and an outlet 9 for compressed air. The turbine 14 has two separate inlet volutes 5 and 6 each leading to a separate nozzle set. Both sets of nozzles are arranged to act upon a common turbine wheel, and the two volutes are respectively connected to the two manifold portions 2 and 3.

In order to enable the turbocharger turbine 13 to be operated when the engine is stationary, or to permit a relatively high speed of operation of the turbocharger to be maintained when the engine-exhaust volume is relatively small, two auxiliary combustion chambers 7 and 17, each of which is equipped with fuel-injection and ignition means 27 and is preferably constructed substantially as described in our U.S.A. Pat. No. 3,676,999, has an air inlet 8 which is arranged to be fed when required with air from a branch 9a of the outlet duct 9 of the compressor part 14 of the turbocharger 4, and each of these auxiliary combustion chambers is arranged to respectively discharge its combustion gases through an opening 7a or 17a into the separate inlet volutes 5 and 6 of the turbocharger turbine 13. It will be readily appreciated that the provision of the auxiliary combustion chambers 7 and 17 supplementing the gas supply to the turbine will not interfere substantially with the possibility obtained by the provision of two separate exhaust systems respectively incorporating the mainfold portions 2 and 3, of permitting each exhaust system to be tuned to ensure, in accordance with the Büchi system, utilisation of the pulsation energy of the exhaust gases, and that it will also ensure absence of interference with the uniformity of engine torque during the respective periods of operation of the engine cylinders whose exhausts are respectively received by the manifold portions 2 and 3, while the availability of all the nozzle sets for the gases from the auxiliary combustion chambers permits maximum turbine torque to be obtained from a turbocharger turbine of given dimensions.

What we claim is:

1. A prime mover which comprises in combination: an internal-combustion engine including a plurality of cylinders each having an inlet and an exhaust outlet; a supercharger including a turbine having a plurality of nozzle groups respectively connected to the exhaust outlet of each cylinder or to the exhaust outlets of the cylinders of each of a plurality of groups into which the plurality of cylinders is divided, to respectively cause exhaust gases from each engine cylinder or group of engine cylinders to provide driving power for the turbine and permit the respective utilization of the discharge rhythm of such cylinder or group of cylinders, and a dynamic compressor driven by said turbine and having an inlet for combustion air and an outlet for compressed air, said outlet being connected to the inlets of all said cylinders; and a plurality of bypass lines each including an auxiliary combustion chamber and each connecting said compressor outlet to a different one of said individual nozzle groups of said turbine, in bypass to the cylinders of the engine.

* * * * *